United States Patent
Lee

(10) Patent No.: US 11,679,762 B2
(45) Date of Patent: Jun. 20, 2023

(54) ACTIVE REAR COLLISION AVOIDANCE APPARATUS AND METHOD

(71) Applicant: MANDO CORPORATION, Pyeongtaek-si (KR)

(72) Inventor: KwangHyung Lee, Gwangju-si (KR)

(73) Assignee: HL Klemove Corp., Incheon (KR)

( * ) Notice: Subject to any disclaimer, the term of this patent is extended or adjusted under 35 U.S.C. 154(b) by 174 days.

(21) Appl. No.: 17/144,364

(22) Filed: Jan. 8, 2021

(65) Prior Publication Data

US 2021/0237723 A1 Aug. 5, 2021

(30) Foreign Application Priority Data

Jan. 9, 2020 (KR) .................. 10-2020-0002884

(51) Int. Cl.
*B60W 30/09* (2012.01)
*G08G 1/16* (2006.01)
(Continued)

(52) U.S. Cl.
CPC .............. *B60W 30/09* (2013.01); *B60Q 5/006* (2013.01); *B60Q 9/008* (2013.01); *B60W 30/18163* (2013.01); *G08G 1/161* (2013.01); *G08G 1/166* (2013.01); *B60W 2554/4041* (2020.02); *B60W 2554/802* (2020.02); *B60W 2556/45* (2020.02); *B60W 2720/106* (2013.01); *B60W 2754/30* (2020.02)

(58) Field of Classification Search
CPC ............. B60W 30/09; B60W 30/0953; B60W 30/18163; B60W 2754/30; B60W 2720/106; B60W 2554/4041; B60W 2554/802; B60W 2556/45; B60Q 9/008; B60Q 5/006; B60Q 1/507; B60Q 1/535; G08G 1/161; G08G 1/167
USPC ............................................................ 701/26
See application file for complete search history.

(56) References Cited

U.S. PATENT DOCUMENTS 10,762,786 B1 * 9/2020 Dewey .................. B60W 10/18
10,843,693 B2 * 11/2020 Deshpande .......... B62D 15/025
(Continued)

FOREIGN PATENT DOCUMENTS

CN 111731277 A * 10/2020 ........ B60W 60/0016
CN 113257024 A * 8/2021
(Continued)

*Primary Examiner* — Atul Trivedi
(74) *Attorney, Agent, or Firm* — Morgan, Lewis & Bockius LLP

(57) ABSTRACT

The present disclosure relates to an active rear collision avoidance apparatus and method. The apparatus includes a sensor for acquiring information by detecting at least one of a preceding vehicle, a vehicle at risk of collision or other vehicles; and a controller for determining a possibility of collision between the vehicle at risk of collision and the host vehicle, determining a direction of avoidance preferentially from where an avoidable area exists in response to the driving of the vehicle at risk of collision, if the possibility of collision is higher than or equal to a threshold point, controlling the host vehicle to drive to avoid in the determined direction of avoidance, and controlling the host vehicle to drive to avoid a possible collision in response to a response to the transmitted avoidance request signal from the preceding vehicle and/or the other vehicle.

18 Claims, 10 Drawing Sheets

(51) Int. Cl.
*B60W 30/18* (2012.01)
*B60Q 5/00* (2006.01)
*B60Q 9/00* (2006.01)

(56) References Cited

U.S. PATENT DOCUMENTS

| | | | | |
|---|---|---|---|---|
| 2005/0273263 | A1* | 12/2005 | Egami | G08G 1/163 |
| | | | | 340/436 |
| 2016/0207530 | A1* | 7/2016 | Stanek | B60W 10/184 |
| 2018/0059670 | A1* | 3/2018 | Nilsson | B60W 30/09 |
| 2018/0096601 | A1* | 4/2018 | Chow | H04W 84/00 |
| 2019/0061743 | A1* | 2/2019 | Ozawa | B60W 20/15 |
| 2019/0088138 | A1* | 3/2019 | Kang | B60W 50/14 |
| 2019/0098953 | A1* | 4/2019 | Strickland | G06V 20/58 |
| 2019/0100198 | A1* | 4/2019 | Hakki | G08G 1/167 |
| 2019/0126944 | A1* | 5/2019 | Choi | G08G 1/166 |
| 2019/0232958 | A1* | 8/2019 | Deng | B60T 7/22 |
| 2019/0258251 | A1* | 8/2019 | Ditty | G06F 15/7807 |
| 2019/0291725 | A1* | 9/2019 | Yokoi | G06V 20/584 |
| 2019/0308617 | A1* | 10/2019 | Groult | B60Q 1/50 |
| 2019/0329708 | A1* | 10/2019 | Hakki | B60Q 9/008 |
| 2019/0351906 | A1* | 11/2019 | Oh | B60W 30/095 |
| 2019/0382018 | A1* | 12/2019 | Garnault | B60W 30/18163 |
| 2019/0391582 | A1* | 12/2019 | Jung | G06N 20/00 |
| 2020/0122773 | A1* | 4/2020 | Deshpande | B60T 7/12 |
| 2020/0216062 | A1* | 7/2020 | Hakki | B64C 39/00 |
| 2020/0242922 | A1* | 7/2020 | Dulberg | G08G 1/012 |
| 2020/0255001 | A1* | 8/2020 | Rayalsamy | B60W 30/085 |
| 2021/0039636 | A1* | 2/2021 | Kamiya | G06V 20/584 |
| 2021/0122364 | A1* | 4/2021 | Lee | B60W 10/04 |
| 2021/0188261 | A1* | 6/2021 | Song | B60W 50/14 |
| 2021/0197720 | A1* | 7/2021 | Houston | G06N 3/045 |

FOREIGN PATENT DOCUMENTS

| | | | | |
|---|---|---|---|---|
| CN | 113602265 | A * | 11/2021 | |
| CN | 114596250 | A * | 6/2022 | B60W 30/09 |
| CN | 115123227 | A * | 9/2022 | |
| DE | 102018204572 | A1 * | 9/2019 | |
| EP | 3560778 | A1 * | 10/2019 | B60Q 1/52 |
| KR | 20210089846 | A * | 7/2021 | B60W 30/08 |
| WO | WO-2019132082 | A1 * | 7/2019 | B60W 30/165 |

* cited by examiner

ACTIVE REAR COLLISION AVOIDANCE APPARATUS AND METHOD

CROSS REFERENCE TO RELATED APPLICATION

This application claims priority from Korean Patent Application No. 10-2020-0002884, filed on Jan. 9, 2020, which is hereby incorporated by reference for all purposes as if fully set forth herein.

BACKGROUND

Field

The present disclosure generally relates to an active rear collision avoidance apparatus and method, and more particularly, to the active rear collision avoidance apparatus and method capable of detecting and avoiding any approaching vehicle driving behind a host vehicle.

Description of Related Art

In recent years, various sensors and electronic devices tend to be installed and used in many vehicles for convenience and safety of the drivers in driving the vehicles. In particular, in-depth researches on an advanced driver assistance system (ADAS) are being widely made for the user's driving convenience and safety. Furthermore, the development of autonomous vehicles is being actively conducted in the field of automobile industry.

An obstacle detection and avoidance function installed in such an autonomous vehicle has been mainly applied focusing upon its driving. For example, there is an autonomous driving algorithm by which an autonomous vehicle in operation is adapted to recognize and avoid other vehicles, pedestrians, and obstacles existing in the direction of driving. Most of these obstacle detection and avoidance functions are in fact designed for adaptation to the driving of the autonomous vehicle itself.

However, in situations where a rear-end collision is most likely expected due to the driver's inattentiveness or drowsiness, or any error in the system of the autonomous vehicle, an effective counter-measure for safety of the autonomous vehicle is required when any avoidable area does not exist or is not available.

BRIEF SUMMARY

In the context of the foregoing, embodiments of the present disclosure aim to provide an active rear collision avoidance apparatus and method capable of controlling a host vehicle to avoid other vehicles at risk of collision according to a priority preset for each circumstance when the vehicle at risk of collision is approaching from the rear.

To address the foregoing and other problems, according to one aspect, the present disclosure provides an active rear collision avoidance apparatus, comprising a sensor for acquiring information by detecting at least one of a preceding vehicle driving ahead in the same lane as a host vehicle, a vehicle at risk of collision, or other vehicles driving in an adjacent lane, within a predetermined distance from the host vehicle; and a controller for determining a possibility of collision between the vehicle at risk of collision and the host vehicle, determining a direction of avoidance preferentially from where an avoidable area exists in response to the driving of the vehicle at risk of collision, when the possibility of collision is higher than or equal to a threshold point, the direction of avoidance being determined in the order of a driving lane of the host vehicle and its adjacent lane, controlling the host vehicle to drive to avoid in the determined direction of avoidance if the determined direction of avoidance is within the avoidable area, transmitting an avoidance request signal to the preceding vehicle and the other vehicle driving in an adjacent lane if there are any preceding vehicle and/or the other vehicle driving in the determined direction of avoidance, and controlling the host vehicle to drive to avoid a possible collision in response to a response to the transmitted avoidance request signal from the preceding vehicle and/or the other vehicle.

According to another aspect, the present disclosure provides an active rear collision avoidance method, comprising a neighboring vehicle location receiving step for acquiring information by detecting at least one of a preceding vehicle driving ahead in the same lane as a host vehicle, a vehicle at risk of collision, or other vehicles driving in adjacent lanes, within a predetermined distance from the host vehicle; a collision risk determination step for determining a possibility of collision between the vehicle at risk of collision and the host vehicle; an avoidance direction determination step for determining a direction of avoidance preferentially from a space where an avoidable area exists in response to the driving of the vehicle at risk of collision, when the possibility of collision is higher than or equal to a threshold point, the direction of avoidance being determined in the order of a driving lane of the host vehicle and its adjacent lanes; and a host vehicle control step for controlling the host vehicle to drive to avoid in the determined direction of avoidance if the determined direction of avoidance is within the avoidable area, transmitting an avoidance request signal to the preceding vehicle and the other vehicles driving in the adjacent lanes if there are any preceding vehicle and/or the other vehicles driving in the determined direction of avoidance, and driving the host vehicle to avoid a possible collision in response to a response from the preceding vehicle and/or the other vehicles for the avoidance request signal.

According to the present disclosure, it is possible to provide an active rear collision avoidance apparatus and method enabling a host vehicle to avoid a collision with another vehicle at risk of collision, by controlling neighboring vehicle vehicles by means of V2X (Vehicle to Everything) according to the priority preset for a respective situation, in a situation in which it is expected a possible collision between the host vehicle and the vehicle at risk of collision.

DETAILED DESCRIPTION

Figure 1:
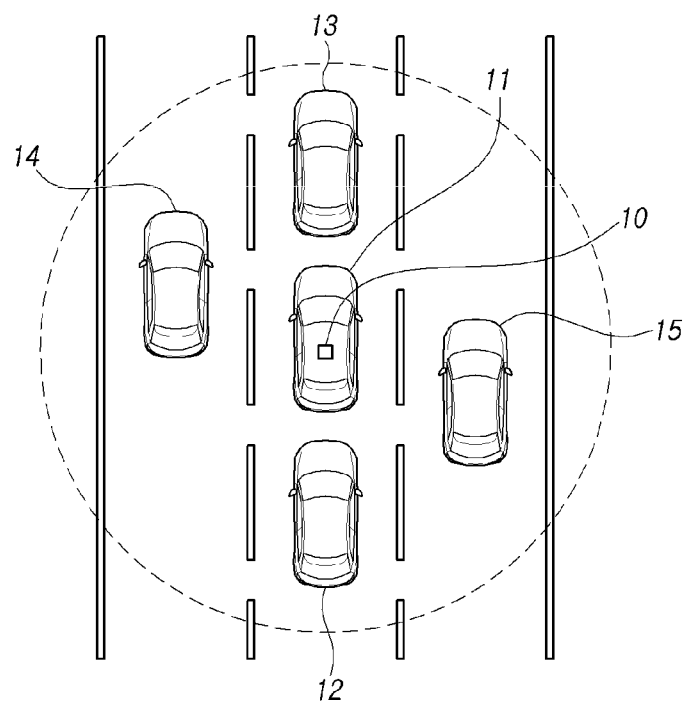
FIG. 1 is a diagram illustrating an exemplar scheme in which an active rear collision avoidance apparatus according to an embodiment of the present disclosure detects vehicles driving within a predetermined distance.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, an active rear collision avoidance apparatus according to the present disclosure will be described with reference to FIG. 1.

FIG. 1 is a diagram illustrating an exemplary situation in which an active rear collision avoidance apparatus according to an embodiment of the present disclosure detects a vehicle driving within a predetermined distance.

Referring now to FIG. 1, an active rear collision avoidance apparatus 10 according to the present disclosure may detect the active rear collision avoidance apparatus itself 10, a host vehicle 11, a vehicle 12 at risk of collision driving behind, a preceding vehicle 13 driving ahead, and other vehicles 14 and/or 15 driving in an adjacent lane, travelling within a predetermined distance from the host vehicle.

The active rear collision avoidance apparatus 10 may communicate with one or more of the preceding vehicle 13 and the other vehicles 14 and 15 to provide or receive information thereto/therefrom. Here, the information may be a set of GPS information capable of identifying a location between those vehicles, or sensing information obtained by at least one sensor mounted in a vehicle such as e.g., a RADAR system. Further, the information may be reciprocated between those vehicles by a server capable of communicating with respective vehicles, and the active rear collision avoidance device 10 may transmit the information provided through the server from the vehicles, in response to a request signal.

The host vehicle 11 may be of an autonomous vehicle according to one example. Here, the autonomous vehicle may refer to a vehicle having a function of detecting and processing external information during driving, recognizing its surrounding environment to determine its driving route by itself, and independently driving by using its own power. The host vehicle 11 may be provided with an active rear collision avoidance apparatus 10, through which a control signal for the host vehicle 11 may be received, although such a configuration may be only an example and is not limited thereto. In other words, although the following description is made on the premise that the host vehicle 11 is an autonomous vehicle, it may be a vehicle equipped with a driver assistance system including an active rear collision avoidance device 10 only if the technical ideas set forth in in the following description can be applied substantially the same. Further, the vehicle described in the present disclosure may be of any type of vehicle equipped with a prime mover to drive wheels with its power to move on the ground without via a railway or any other temporary track.

The vehicle 12 at risk of collision may be a vehicle approaching from the rear of the host vehicle 11 toward the host vehicle 11, irrespective of whether it is an autonomous vehicle as described above or a conventional vehicle directly driven by a driver riding thereon.

Such a vehicle 12 at risk of collision may approach the host vehicle 11 from the rear thereof in the same lane as the host vehicle 11, or from an adjacent lane toward the host vehicle 11 itself. The vehicle 12 at risk of collision is not limited to a movement from a specific lane as long as it can be approached toward the host vehicle 11.

The preceding vehicle 13 is a leading vehicle running ahead of the host vehicle 11 in the same lane as the host vehicle 11 and may be an autonomous vehicle. The preceding vehicle 13 may receive an avoidance request signal from the active rear collision avoidance apparatus 10, and determine whether the preceding vehicle 13 can provide an avoidance space for the host vehicle 11 in response the signal. If it is determined to be 'possible' for the avoidance request signal, the preceding vehicle 13 may drive to provide a space for the host vehicle 11 to avoid a collision.

The active rear collision avoidance apparatus 10 may detect a following vehicle, which may be of an autonomous vehicle driving behind the host vehicle 11 in the same lane as the host vehicle 11. If the vehicle 12 at risk of collision is in the same lane as the host vehicle 11, approaching from the rear side of the host vehicle 11, the following vehicle may be another vehicle driving behind the vehicle 12 at risk of collision.

The other vehicles 14 and 15 may be any vehicles other than the vehicle 12 at risk of collision, the preceding vehicle 13 and the following vehicle, among vehicles detected within a predetermined distance of the host vehicle 11. More specifically, the other vehicles 14 and 15 may include vehicles driving in the left and right lanes each right adjacent to the lane of the host vehicle 11, and further include any other vehicles driving behind those vehicles in the right and left adjacent lanes, if they are driving all the way within the above predetermined distance.

The preceding vehicle 13, the following vehicle and other vehicles 14, 15 may communicate information with the active rear collision avoidance apparatus 10 provided in the host vehicle 11 through V2X (Vehicle to Everything), and be controlled to provide an avoidance space for the host vehicle 11 by receiving an avoidance request signal from the host vehicle 11.

The V2X, a vehicle to vehicle communication used in the present disclosure, may designate a scheme that a vehicle exchanges information with various objects such as other vehicles, mobile devices, and roads via a wired/wireless communication network, or a technology thereof, and include V2V (Vehicle to Vehicle communication), V2I (Vehicle to Infrastructure communication), V2N (Vehicle to Nomadic Device communication), V2P (Vehicle to Pedestrian communication) an so on. In the present embodiment, V2V communication may be generally used, which is of the most typical vehicle-to-vehicle communications in this field of technology.

The V2X is generally based on Dedicated Short-Range Communications (DSRC), and may use WAVE (Wireless Access in Vehicular Environment) recently introduced by the American Institute of Electrical and Electronic Engineers (IEEE) or IEEE 802.11p communication technology using the 5.9 GHz band may be used, although not limited thereto, and it should be understood that V2X is of the concept inclusive of all types of vehicle-to-vehicle communications to be used or developed in the present state of the art or in the future.

The active rear collision avoidance apparatus 10 may detect the vehicle 12 at risk of collision, the preceding vehicle 13, and the other vehicles 14, 15 driving within a predetermined distance, and detect whether the vehicle at risk of collision is approaching the host vehicle 11. Further, the active rear collision avoidance apparatus 10 may determine the possibility of collision between the host vehicle 11 and the vehicle 12 at risk of collision approaching the host vehicle 11.

If the determined possibility of collision is greater than or equal to a threshold point, then the active rear collision avoidance apparatus 10 may determine the surrounding situation of the host vehicle 11 to control the host vehicle 11 to avoid the vehicle 12 at risk of collision according to a predetermined priority.

Figure 2:
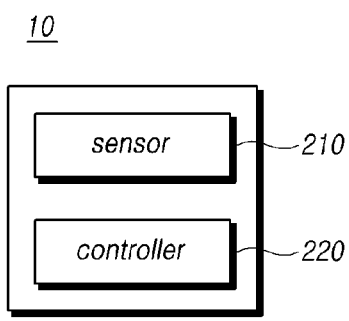
FIG. 2 is a block diagram of an active rear collision avoidance apparatus according to an exemplary embodiment.

FIG. 2 is a block diagram of an active rear collision avoidance apparatus 10 according to an exemplary embodiment.

The active rear collision avoidance apparatus 10 may include a sensor 210 and a controller 220.

The sensor 210 may obtain information by detecting at least one of a preceding vehicle 13 in the same lane as a host vehicle 11, a vehicle 12 at risk of collision, or other vehicles driving in an adjacent lane, within a predetermined distance from the host vehicle 11.

The sensor 210 may include at least one of an image sensor such as a camera to detect the vehicle 12 at risk of collision, the preceding vehicle 13, and the other vehicles 14 and/or 15, etc., a GPS sensor, or a Lidar (Light Detection And Ranging) system for implementation of a 3D model of surroundings, a laser sensor for measuring a distance, or an infrared sensor.

The radar sensor or radar system used in the present disclosure may include at least one radar sensor, for example, one or more of a front detection radar sensor mounted at the front end of a vehicle, a rear detection radar sensor mounted at the rear end of the vehicle, or a lateral or side-rear detection radar sensor mounted at the each side of the vehicle. Such a radar sensor or radar system may process data by analyzing transmission/reception signals, and thus, detect information for an object in target. Further, the radar sensor or radar system may include an electronic control unit (ECU) or controller, or any other processor for implementing the above operation. For data transmission or signal communication from the radar sensor (or radar system) to the ECU, a communication link such as a suitable vehicle network bus may be used.

The sensor 210 may detect one or more of the vehicle 12 at risk of collision, the preceding vehicle 13 and other vehicles 14 and 15, to obtain information on a distance between the detected vehicle and the host vehicle 11, a relative/absolute speed of the host vehicle with respect to other vehicles, a lane interval, and so on, in relation to the host vehicle 11 and its adjacent vehicles.

The controller 220 may determine a possibility of collision between the vehicle 12 at risk of collision and the host vehicle 11, and if the possibility of collision is greater than or equal to a threshold point, then determine a direction of avoidance firstly from a place where an avoidable area exists in response to the driving of the vehicle 12 at risk of collision, wherein the direction of the avoidance may be determined in the order of the driving lane of the host vehicle 11 and then its adjacent lane. If the determined direction of avoidance is within the avoidable area, then the host vehicle 11 can be controlled to avoid toward the determined direction of avoidance. Further, if there is another vehicle 14 and/or 15 driving in the determined direction of avoidance, the controller 220 may transmit an avoidance request signal to the other vehicles 14 and/or 15, and then, the host vehicle 11 can be controlled to avoid the other vehicle 14 and/or 15 in response to a response from the same for the avoidance request signal.

The controller 220 may determine the probability of a collision between the host vehicle 11 and the vehicle 12 at risk of collision, based on the information on the vehicle 12 at risk of collision obtained from the sensor 210. Such a calculation of the possibility of collision may be implemented by a known technology, which is not limited to a certain specific technology so long as the possibility of collision between the host vehicle 11 and the vehicle 12 at risk of collision can be determined effectively. For example, it is possible to determine the possibility of collision by computing a longitudinal relative speed and a lateral relative speed of the vehicle 12 at risk of collision based on the relative speeds of the host vehicle 11 and the vehicle 12 at risk of collision obtained through the sensor 210, and then making an arithmetic operation according to a predetermined mathematic equation.

If the possibility of collision between the host vehicle 11 and the vehicle 12 at risk of collision is greater than or equal to the threshold point, then the controller 220 may determine that the possibility of a collision is high and whether there exists an avoidable area for controlling the host vehicle 11 to avoid the vehicle 12 at risk of collision. Here, the avoidable area may be an area in which the host vehicle 11 can be prevented from a collision risk so that the possibility of collision with the vehicle 12 at risk of collision can be lowered below the threshold point. For example, the avoidable area may be a front area if there is no preceding vehicle 13 in the lane in which the host vehicle 11 is driving, or may be an adjacent lane in which no vehicle is driving.

The controller 220 may control the host vehicle 11 to avoid the vehicle 12 at risk of collision by determining the direction of avoidance in the order of a currently driving lane of the host vehicle 11 and then its adjacent lane. Here, the adjacent lane refers to a lane abutting the driving lane of the host vehicle 11, and if there is no spatial difference between the adjacent two lanes, then either one of the left and right lanes may be selected to determine the direction of avoidance. Furthermore, in case where the demarcation of lanes on the road on which the host vehicle 11 is driving is faint or ambiguous, a virtual lane may be set based on the driving direction of the host vehicle 11 to distinguish the driving lane of the host vehicle 11 from its adjacent lane, thereby determining the direction of avoidance effectively.

If there is either the preceding vehicle 13 or another vehicle 14 or 15 in the determined direction of avoidance, then the controller 220 may transmit an avoidance request signal to the preceding vehicle 13 or the other vehicles 14 and/or 15, and in response to a response from the preceding vehicle 13 or the other vehicles 14 and/or 15 for the avoidance request signal, it may control the host vehicle 11 to avoid.

The controller 220 may determine the direction of avoidance even in a situation where there is no avoidable area. The controller 220 may transmit the avoidance request signal for avoidance of the host vehicle 11 to the preceding vehicle 13 or other vehicles 14 and/or 15 running in the direction of avoidance. Further, the controller 220 may receive a response to the transmitted avoidance request signal, and control the host vehicle 11 to avoid in response to the driving of the preceding vehicle 13 or the other vehicles 14 and/or 15. At this moment, the driving of the preceding vehicle 13 or the other vehicles 14 and 15 may be of acceleration, deceleration, or changing lanes so as to create an avoidance space for the host vehicle 11.

Figure 3:
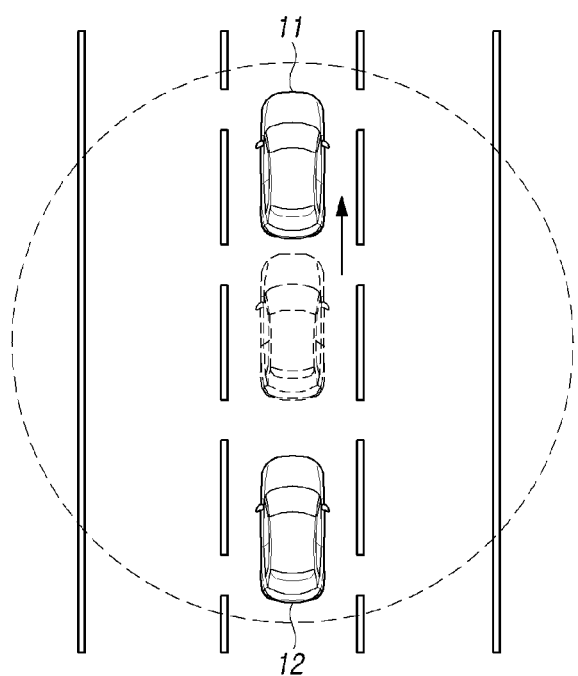
FIG. 3 is a diagram for explaining the control of a host vehicle, when there exists an avoidable area in a driving lane of the host vehicle and a direction of avoidance is determined as the driving lane of the host vehicle, according to an exemplary embodiment.
Figure 4:
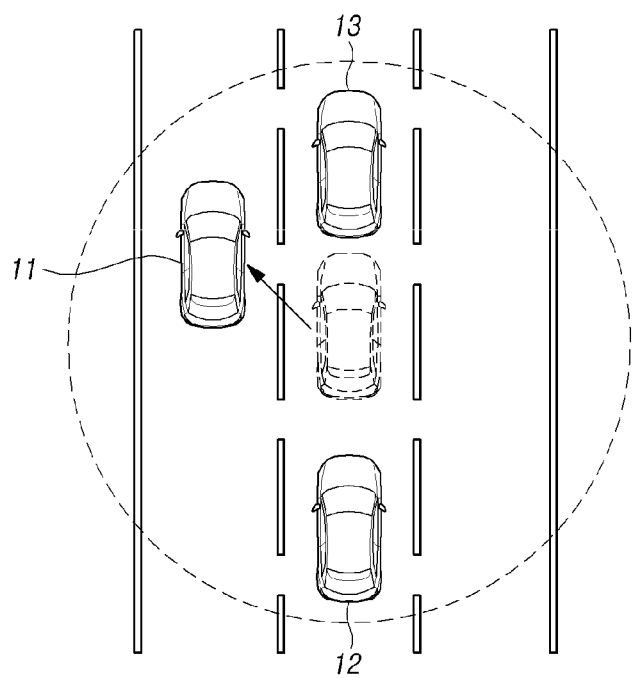
FIG. 4 is a diagram for explaining the control of the host vehicle, when there exists an avoidable area in an adjacent lane of the host vehicle and the direction of avoidance is determined as the adjacent lane, according to an exemplary embodiment.

FIG. 3 shows a diagram for explaining the control of a host vehicle 11 when there exists an avoidable area in the driving lane of the host vehicle 11 and the direction of avoidance is determined as a front side of the host vehicle, according to an exemplary embodiment, and FIG. 4 shows a diagram for explaining the control of the host vehicle 11 when there exists an avoidable area in an adjacent lane of the host vehicle 11 and the direction of avoidance is determined as the adjacent lane, according to an exemplary embodiment.

Referring now to FIG. 3, when there exists an avoidable area in the driving lane of the host vehicle 11 and the direction of avoidance is determined as the driving lane of the host vehicle 11, the controller 220 may control the host vehicle 11 to be accelerated in the driving direction. Here, the degree of acceleration for the host vehicle 11 would be sufficient just so long as it can move away from the vehicle 12 at risk of collision or maintain a safe distance from the vehicle 12 at risk of collision, and is not limited to a specific degree of acceleration. Moreover, the controller 220 may accelerate the host vehicle 11 until the preceding vehicle 13 is detected within a predetermined distance.

Referring then to FIG. 4, when an avoidable area exists in an adjacent lane of the host vehicle 11 and the direction of avoidance is determined as the adjacent lane, the controller 220 may control to accelerate the host vehicle 11 to change the driving lane to the adjacent lane.

The controller 220 may control to select one of the two adjacent lanes, that is, the left lane and the right lane, to accelerate and change lanes, when the avoidable area exists in both the left lane and the right lane. Further, if it is determined that only one of the two lanes has such an avoidable area, then the controller 220 may control the host vehicle 11 to accelerate and change lanes to a lane in which that avoidable area exists.

As apparent from the foregoing, the active rear collision avoidance apparatus 10 according to the present disclosure may control to preferentially select a lane in which an avoidable area exists, in avoiding a collision between the vehicle 12 at risk of collision and the host vehicle 11, thereby significantly reducing the likelihood of a collision as well as lowering the possibility of traffic accidents due to abrupt avoidance.

Figure 5:
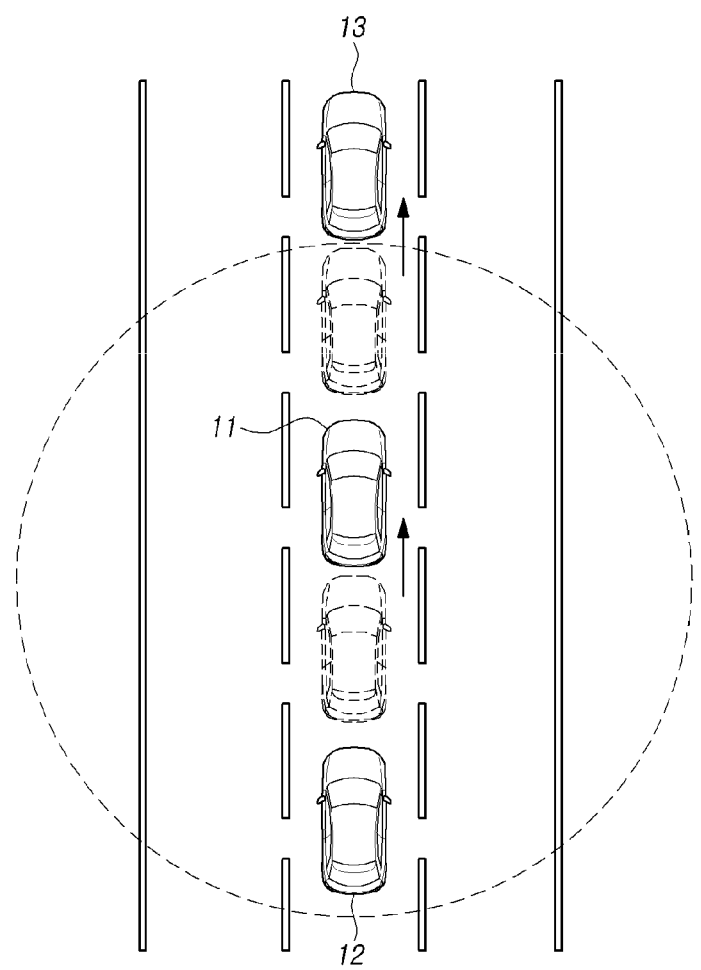
FIG. 5 is a diagram for explaining the control of the host vehicle, when there exists no avoidable area and the direction of avoidance is determined as a driving lane of the host vehicle, according to an exemplary embodiment.

FIG. 5 is a view for explaining the control of the host vehicle 11 when there exists no avoidable area and the direction of avoidance is determined as the driving lane of the host vehicle 11 according to an exemplary embodiment.

Referring then to FIG. 5, when no avoidable area exists and the direction of avoidance is determined as the driving lane of the host vehicle 11, the controller 220 may transmit an avoidance request signal to the preceding vehicle 13 of the host vehicle 11 and receive a response to accept for the avoidance request signal from the preceding vehicle 13, thereby controlling in turn to accelerate the host vehicle 11 to further increase the distance from the vehicle 12 at risk of collision.

The controller 220 may control the host vehicle 11 in response to the driving of the preceding vehicle 13. For example, when the preceding vehicle 13 accelerates in the driving direction of the host vehicle 11, the controller 220 may control the host vehicle 11 to accelerate keeping a safe distance from the preceding vehicle 13. For another example, when the preceding vehicle 13 changes lanes to an adjacent lane, the controller 220 may control the host vehicle to accelerate as in the case where the avoidable area exists in the driving lane ahead of the host vehicle 11.

Figure 6:
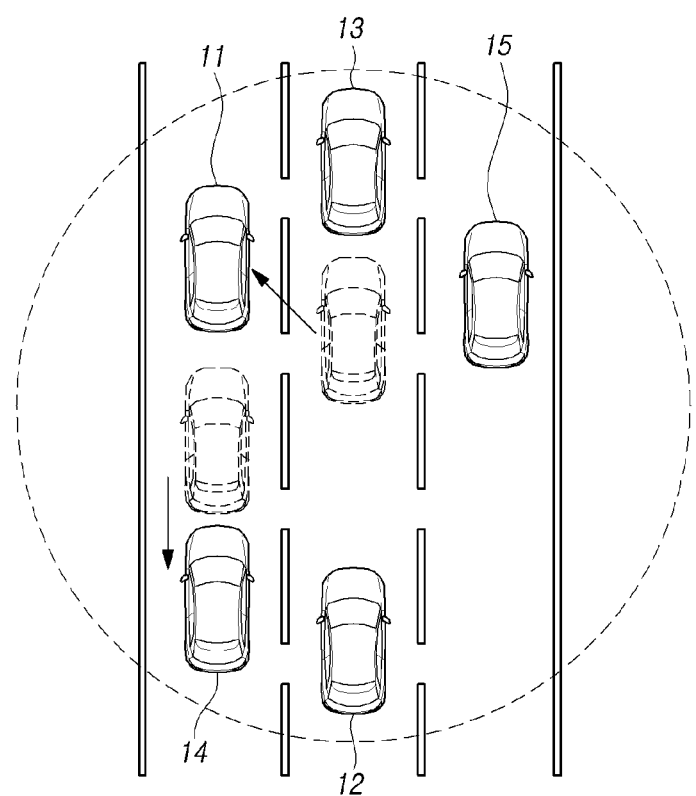
FIG. 6 is a diagram for explaining the control of the host vehicle, when there is no avoidable area and the direction of avoidance is determined as an adjacent lane of the host vehicle according to an exemplary embodiment.

FIG. 6 is a view for explaining the control of the host vehicle 11 when no avoidable area exists and the direction of avoidance is determined as an adjacent lane of the host vehicle 11 according to an exemplary embodiment.

Referring then to FIG. 6, when no avoidable area exists and the direction of avoidance is determined as an adjacent lane of the host vehicle 11, the controller 220 may transmit an avoidance request signal to a vehicle 14 driving alongside in the adjacent lane of the host vehicle 11 and receive a response to the avoidance request signal from the vehicle 14 driving alongside, thereby controlling the host vehicle 11 to change lanes.

The controller 220 may select either one of the two lanes, that is, the left lane and the right lane adjacent to the host vehicle 11, if both the lanes do not have any avoidable area, and transmit the avoidance request signal to the vehicles 14 and/or 15 driving alongside in the selected lane. Further, the controller 220 may control the host vehicle 11 to change lanes in response to the driving of the vehicles 14 and/or 15 driving alongside. For example, when the vehicles 14 and/or 15 driving alongside is driving in acceleration in the adjacent lane, the controller 220 may control the host vehicle 11 to maintain its driving speed and change lanes. As another example, when the vehicles 14 and/or 15 driving alongside is driving in deceleration in the adjacent lane, the controller 220 may control the host vehicle 11 to accelerate and change lanes.

With respect to the adjacent lane of the host vehicle 11 in which any avoidable area does not exist, the controller 220 may compare a distance between a right vehicle driving alongside 15 running in the right lane and another following vehicle the right vehicle driving alongside 15 in the right lane and a distance between a left vehicle driving alongside 14 running in the left lane and another following vehicle the left vehicle driving alongside 14 in the left lane, and then determine the lane having a longer distance as the direction of avoidance.

When a response to reject for the avoidance request signal from the preceding vehicle 13, the controller 220 may modify the direction of avoidance for the host vehicle 11 except for the lane in which the preceding vehicle 13 is located. More specifically, in determining the direction of avoidance when no avoidable area exists, the controller 220 may preferentially determine the driving lane of the host vehicle 11 as the direction of avoidance. The controller 220 may transmit an avoidance request signal to the preceding vehicle 13 in the driving lane of the host vehicle 11 and receive a response thereto. Here, when a response reject for the avoidance request signal from the preceding vehicle 13, the controller 220 may modify the direction of avoidance by selecting any one of the adjacent lanes of the host vehicle 11 with the second priority, except for the lane of the host vehicle 11 with the first priority.

According to the foregoing description, the active rear collision avoidance apparatus 10 according to the present disclosure may create an avoidable area by controlling surrounding vehicles even if there is provided no avoidable area, and accordingly, give rise to an effect to control the host vehicle 11 to avoid a dangerous vehicle 12 at risk of collision.

Figure 7:
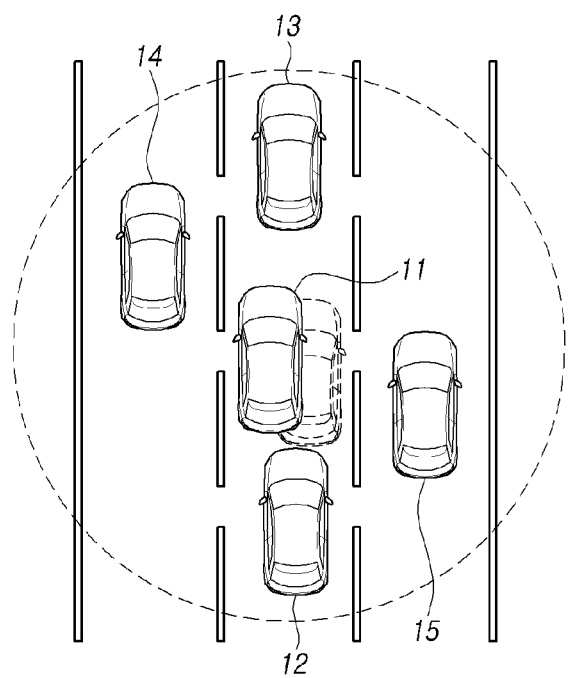
FIG. 7 is a diagram illustrating the control of a host vehicle when a response to reject for the avoidance request signal from the preceding vehicle and the other vehicles corresponding to all direction of avoidance, according to an exemplary embodiment.

FIG. 7 is a diagram illustrating the control of a host vehicle when a response to reject for the avoidance request signal from the preceding vehicle and the other vehicles corresponding to all direction of avoidance, according to an exemplary embodiment.

When the response to reject for the avoidance request signal from the preceding vehicle 13 and the other vehicles 14 and 15 corresponding to all direction of avoidance, the controller 220 may determine an expected amount of impact with the vehicle 12 at risk of collision to control the host vehicle 11 in the direction of generating the minimum amount of impact with the vehicle 12 at risk of collision.

The controller 220 may determine (i.e., calculate) the relative speeds of the host vehicle 11 and the vehicle 12 at risk of collision, the mass of the vehicle 12 at risk of collision, and the longitudinal/lateral speed of the vehicle 12 at risk of collision, as obtained through the sensor 210, and then determine a predicted impact amount by making an arithmetic calculation according to a predetermined mathematic equation. However, the above computational method is only by way of an example, and the predicted impact amount may be implemented by any one of known technologies and is not limited to any one method.

The controller 220 may control the host vehicle 11 to force to emergency braking depending upon a result of a collision caused by the expected minimum impact. In more detail, for example, if it is determined that the vehicle body will be caused to turn around immediately following the collision with the vehicle 12 at risk of collision so that the host vehicle 11 can be driven no longer in the current driving lane, then the controller 220 may control the host vehicle 11 to make an emergency braking.

The controller 220 may control the driving of the host vehicle 11 towards generating the minimum amount of impact to a driver or an occupant of the host vehicle 11. For example, when a driver or occupant is located in the driver's seat (e.g., a front-left seat) of the host vehicle 11, the controller 220 may control the host vehicle 11 in such a way that the opposite side (e.g., rear-right seat) of the host vehicle 11 may possibly collide with the vehicle 12 at risk of collision collide.

Referring back to FIG. 7, the controller 220 may determine the expected amount of impact of the vehicle 12 at risk of collision and the host vehicle 11 to determine that the minimum amount of impact will be made in a collision between the vehicle 12 at risk of collision and the right-rear side of the host vehicle 11, and then, control the host vehicle 11 to drive in the left-side of the lane width.

As apparent from the foregoing, the active rear collision avoidance apparatus 10 according to the present disclosure can give a prediction on a possible amount of impact in a situation where the host vehicle 11 and the vehicle 12 at risk of collision cannot avoid a collision, and make a control of the host vehicle 11 towards undergoing the minimum amount of impact, thereby minimizing the damage of the host vehicle 11.

The controller 220 may control the host vehicle 11 in any direction within the driving lane of the host vehicle 11 so long as it is of the direction in which the minimum amount of impact is expected. For example, if the direction with the expected minimum amount of impact is located within the driving lane of the host vehicle 11 even while contacting the vehicles 14 and/or 15 driving alongside in the adjacent lane, the controller 220 may control the host vehicle 11 to drive in the direction in which the minimum amount of impact is generated.

In case where the driving of the vehicle 12 at risk of collision is controllable through V2X, the controller 220 may transmit a speed adjustment request signal to the vehicle 12 at risk of collision to control its distance from the host vehicle 11 at a predetermined level.

When the sensor 210 detects the vehicle 12 at risk of collision driving within a predetermined distance from the rear end of the host vehicle 11, the controller 220 may determine whether it is possible to control through the vehicle 12 at risk of collision and V2X, based on information obtained from the sensor 210. Further, if it is determined that the vehicle 12 at risk of collision is controllable through V2X, then the controller 220 may transmit a speed adjustment request signal to the vehicle 12 at risk of collision, for controlling the vehicle 12 to keep spaced apart from the host vehicle 11 by a predetermined vehicle interval. Here, the predetermined vehicle interval may be a mandatory safety distance between a host vehicle 11 and a vehicle 12 at risk of collision specified in the traffic regulations.

When the possibility of collision between the vehicle 12 at risk of collision and the host vehicle 11 is greater than or equal to the threshold point, the controller 220 may transmit information on the vehicle 12 at risk of collision to the preceding vehicle 13, the following vehicle 16, the vehicle 12 at risk of collision, and other vehicles 14 and 15.

As a basis for avoiding a collision with the vehicle 12 at risk of collision, the controller 220 may transmit the information on the vehicle 12 at risk of collision to the vehicles running within a predetermined vehicle distance. Here, such a transmission of the information on the vehicle 12 at risk of collision even to the vehicle 12 itself at risk of collision is to alert its driver or occupant riding on the vehicle 12 at risk of collision.

The controller 220 may transmit an avoidance request signal to the preceding vehicle 13 and the other vehicles 14 and 15, running in the determined direction of avoidance. Further, if any signal responding to the transmitted avoidance request signal is not received, the controller 220 may determine the avoidable area again, and preferentially determine any avoidable area without the preceding vehicle 13 and the other vehicles 14, 15 running in the avoidable area.

That is, the controller 220 may determine the preceding vehicle 13 and the other vehicles 14 and 15, which have no communication capability with the host vehicle 11, as uncontrollable objects, and set them as an avoidance target.

As understood from the foregoing, the active rear collision avoidance apparatus 10 according to the present disclosure can transmit information on the vehicle 12 at risk of collision to those vehicles running within a predetermined distance, thereby providing a basis for avoidance by the host vehicle 12 and effectively reducing the possibility of a collision between the vehicle 12 at risk of collision and the host vehicle 11.

If the response to the avoidance request signal received from the preceding vehicle 13 and other vehicles 14 and 15 is to secure a space for avoidance of the host vehicle 11, the controller 220 may control the host vehicle 11 to evade into the space secured by the other vehicles 14 and 15.

More specifically, the controller 220 may detect the vehicle 12 at risk of collision, and transmit an avoidance request signal to the vehicle driving in the direction of avoidance (e.g., the vehicles 14 and 15 driving alongside in the adjacent lane) in order to avoid a collision between the vehicle 12 at risk of collision and the host vehicle 11, and control the host vehicle 11 to avoid in response to a response to the avoidance request signal. Here, the response to the avoidance request signal may be not for the other vehicles driving in the direction of avoidance to secure an avoidable space while keeping the safe vehicle interval, and it may be determined as an emergency situation to physically secure any avoidable space by the host vehicle itself 11. For example, the response to the avoidance request signal may be for the vehicles 14 and/or 15 driving alongside to secure an avoidable space for the host vehicle 11 without keeping the safe vehicle interval, or for the preceding vehicle 13 to drive getting closer towards either one side in the driving lane of the host vehicle 11 to secure the avoidable space for the host vehicle 11.

As described above, it is appreciated that the active rear collision avoidance apparatus 10 according to the present disclosure has an effect of securing an avoidance space more effectively in an emergency situation.

The controller 220 may control to output a horn or a hazard light when the possibility of collision between the vehicle 12 at risk of collision and the host vehicle 11 is greater than or equal to the threshold point. Further, the controller 220 may output a horn or a hazard light to draw attention to a driver or passengers aboard the vehicle 12 at risk of collision. Furthermore, the controller 220 may control to turn on a headlight or a turn indicator mounted in the host vehicle 11 with a view to providing neighboring vehicles with traffic information.

The active rear collision avoidance apparatus 10 according to the present disclosure may be implemented as an electronic control unit (ECU). The electronic control unit may include at least one of one or more processors, memories, storages, user interface inputs or user interface outputs, and they may communicate with each other through at least one bus. Further, the electronic control unit may further include a network interface for accessing the network. The processor may be a CPU or a semiconductor device to execute processing instructions stored in the memory and/or the storage. The memory and storage may further include various types of volatile/nonvolatile storage media. For example, the memory may include ROM and RAM.

Hereinafter, a description will be made to an active rear collision avoidance method using the active rear collision avoidance apparatus 10 capable of performing all of the present disclosure.

Figure 8:
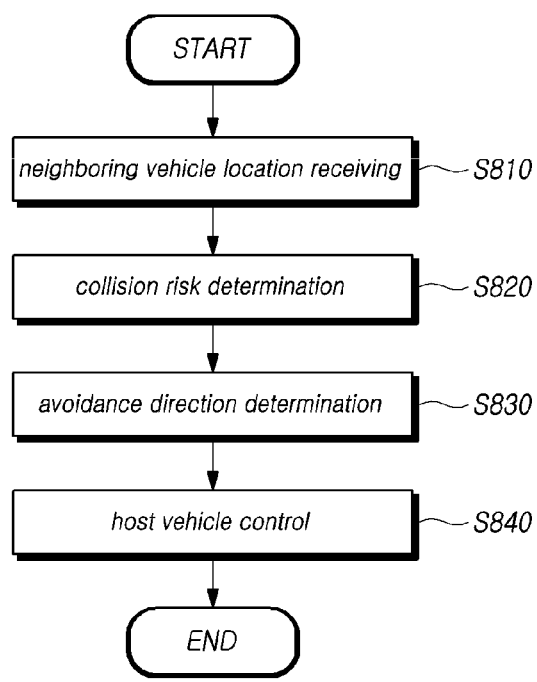
FIG. 8 is a flowchart illustrating an active rear collision avoidance method according to an exemplary embodiment.

FIG. 8 is a flowchart illustrating the active rear collision avoidance method according to an embodiment of the present disclosure.

Referring now to FIG. 8, the active rear collision avoidance method according to the present disclosure may include a neighboring vehicle location receiving step S810 of acquiring information by detecting at least one of a preceding vehicle 13 in the same lane as a host vehicle 11, a vehicle 12 at risk of collision, or other vehicles 14 and/or 15 driving in adjacent lanes, within a predetermined distance from the host vehicle; a collision risk determination step S820 of determining a possibility of collision between the vehicle 12 at risk of collision and the host vehicle 11; an avoidance direction determination step S830 of determining a direction of avoidance preferentially from a space where an avoidable area exists in response to the driving of the vehicle 12 at risk of collision, when the possibility of collision is higher than or equal to a threshold point, the direction of avoidance being determined in the order of a driving lane of the host vehicle 11 and its adjacent lanes; and a host vehicle control step S840 of controlling the host vehicle 11 to drive to avoid in the determined direction of avoidance if the determined direction of avoidance is within the avoidable area, transmit an avoidance request signal to the preceding vehicle 13 and the other vehicles 14 and/or 15 driving in the adjacent lanes if there are any preceding vehicle 13 and/or the other vehicles 14 and/or 15 driving in the determined direction of avoidance, and drive the host vehicle 11 to avoid a possible collision in response to a response from the preceding vehicle 13 and/or the other vehicles 14 and/or 15 for the avoidance request signal.

The host vehicle control step may further include a step of, when the avoidable area exists in the driving lane of the host vehicle 11 and the direction of avoidance is determined to be a forward direction, controlling the host vehicle 11 to accelerate in the driving direction of the host vehicle 11, and when the avoidable area exists in the adjacent lane and the direction of avoidance is determined to be a side direction, controlling the host vehicle 11 to accelerate and change lanes.

The host vehicle control step may further include a step of, if no avoidable area exists and the direction of avoidance is determined to be a forward direction, then transmitting an avoidance request signal to the preceding vehicle 13 the host vehicle 11 and, upon receiving a response of acceptance for the avoidance request signal, controlling the host vehicle 11 to accelerate to increase the distance from the vehicle 12 at risk of collision.

The host vehicle control step may further include a step of, if no avoidable area does exist and the direction of avoidance is determined as an adjacent lane, then transmitting an avoidance request signal to the vehicles 14 and/or 15 driving alongside in the adjacent lane of the host vehicle 11, and upon receiving a response of acceptance for the avoidance request signal from the vehicles 14 and/or 15 driving alongside, controlling the host vehicle 11 to change lanes.

The avoidance direction determination step may further include a step of, upon receiving a response to reject for the avoidance request signal from the preceding vehicle 13, then modifying the direction of avoidance of the host vehicle 11 except for the direction of avoidance in which the preceding vehicle 13 is located.

The host vehicle control step may further include a step of, upon receiving a response to reject for the avoidance request signal from the preceding vehicle 13 and the other vehicles 14 and 15 corresponding to all direction of avoidance, then modifying an expected amount of impact with the vehicle 12 at risk of collision and then controlling the host vehicle 11 to drive in a direction corresponding to the minimum amount of impact with the vehicle 12 at risk of collision.

The avoidance direction determination step may further include a step of, if the vehicle 12 at risk of collision is controllable through V2X, then transmitting a speed adjustment request signal to the vehicle 12 at risk of collision for controlling to keep a predetermined vehicle interval from the host vehicle 11.

The avoidance direction determination step may further include a step of, if the possibility of collision between the vehicle 12 at risk of collision and the host vehicle 11 is greater than or equal to the threshold point, then transmitting information on the vehicle 12 at risk of collision to the preceding vehicle 13, the vehicle 12 at risk of collision, and other vehicles 14 and/or 15, running within a predetermined distance.

The host vehicle control step may further include a step of, if the response of the avoidance request signal received from the preceding vehicle 13 and the other vehicles 14 and/or 15 is to secure a space into which the host vehicle 11 can avoid, then controlling the host vehicle 11 to evade into the space secured by the preceding vehicle 13 and the other vehicles 14 and 15.

The avoidance direction determination step may further include a step of, if the possibility of collision between the vehicle 12 at risk of collision and the host vehicle 11 is greater than or equal to a threshold point, then controlling to output a horn or a hazard light.

Figure 9:
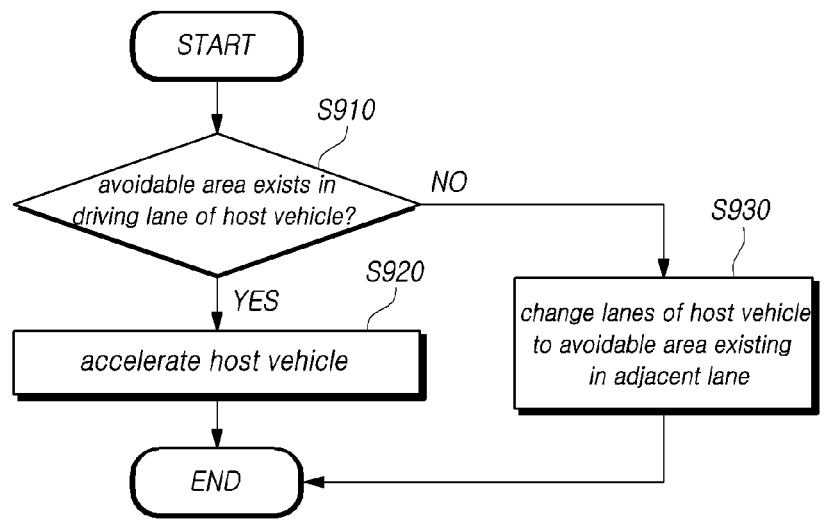
FIG. 9 is a flowchart illustrating an active rear collision avoidance method of controlling a host vehicle according to the priority when there exists an avoidable area according to an exemplary embodiment.

FIG. 9 is a flowchart illustrating a method of controlling the host vehicle 11 according to the priority when there exists an avoidable area according to an exemplary embodiment.

Referring now to FIG. 9, the active rear collision avoidance apparatus 10 may determine whether an avoidable area exists in the driving lane of the host vehicle 11 (S910). In determining the direction of avoidance, the active rear collision avoidance apparatus 10 may prioritize, among others, whether or not such an avoidable area exists.

If the avoidable area exists in the driving lane of the host vehicle 11 (YES in S910), then the active rear collision avoidance apparatus 10 may control the host vehicle 11 to maintain the driving lane as it is and accelerate it (S920). The active rear collision avoidance apparatus 10 may control the host vehicle 11 to accelerate until a distance from the vehicle 12 at risk of collision is maintained at a predetermined interval, or accelerate until the preceding vehicle 13 is detected within a predetermined distance.

If there exists no avoidable area in the driving lane of the host vehicle 11 (NO in S910), then the active rear collision avoidance apparatus 10 may control the host vehicle 11 to change lanes to the adjacent lane of the host vehicle 11 where the avoidable area exists (S930). If the avoidable area exists in both the lanes of the left and right adjacent lanes, then the active rear collision avoidance apparatus 10 may control the host vehicle 11 to select either one of the two lanes to change lanes to the selected lane.

Figure 10:
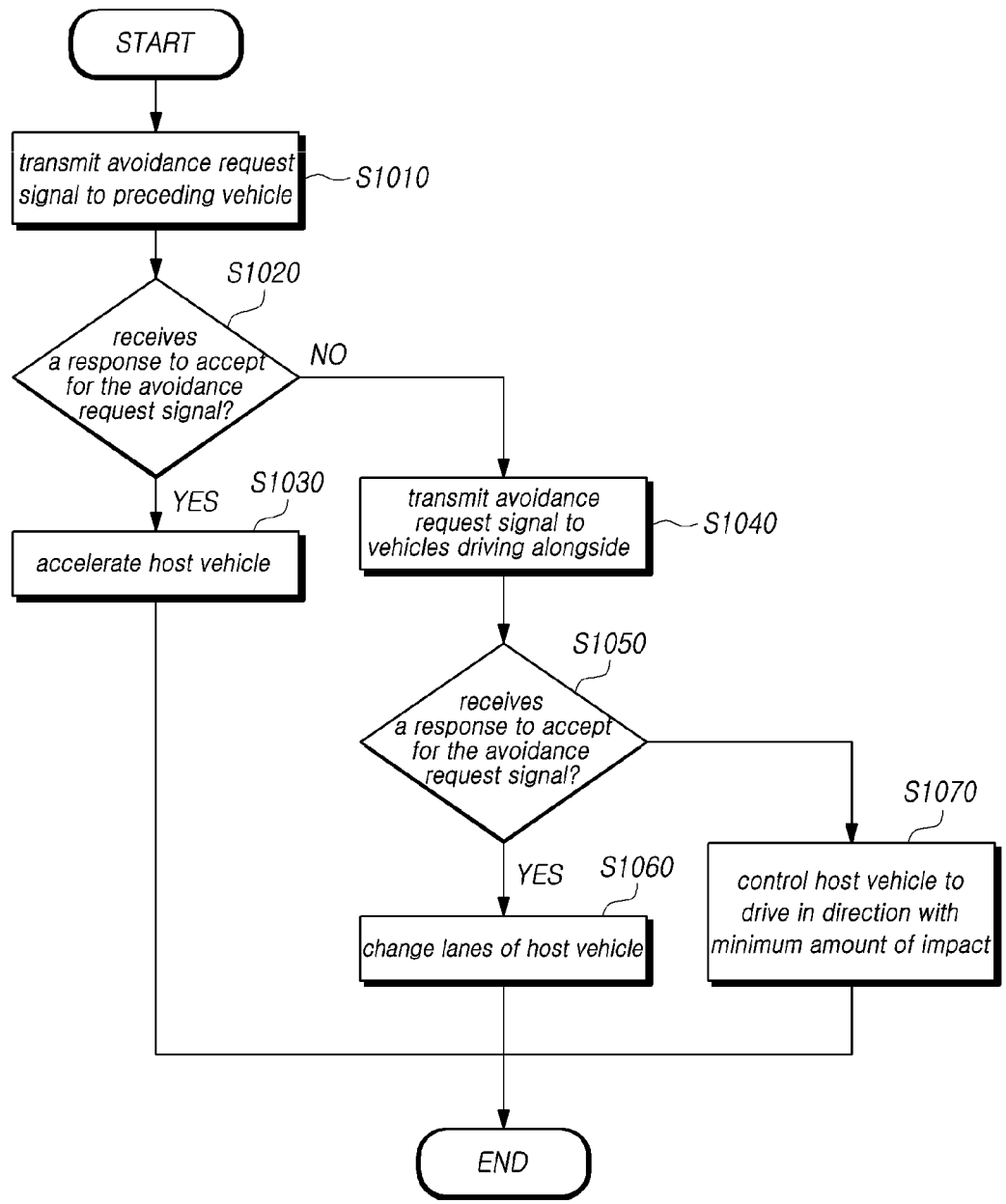
FIG. 10 is a flowchart illustrating an active rear collision avoidance method of controlling a host vehicle when there exists no avoidable area according to an exemplary embodiment.

FIG. 10 is a flowchart illustrating a method of controlling the host vehicle 11 when there is no avoidable area according to an exemplary embodiment.

The active rear collision avoidance apparatus 10 may transmit an avoidance request signal to the preceding vehicle 13 (S1010). In determining the direction of avoidance, the active rear collision avoidance apparatus 10, if it is determined that no avoidable area exists, may then transmit the avoidance request signal to the preceding vehicle 13 for preparing an avoidable area for the host vehicle 11.

The active rear collision avoidance apparatus 10 may receive a response to the avoidance request signal from the preceding vehicle 13 (S1020).

When the response to accept for the avoidance request signal (YES in S1020), the active rear collision avoidance apparatus 10 may control the host vehicle 11 to accelerate (S1030). At this time, the preceding vehicle 13 may accelerate to provide an avoidable area or change lanes to an adjacent lane.

When the response to reject for the avoidance request signal (NO in S1020), the active rear collision avoidance apparatus 10 may transmit an avoidance request signal to the vehicles 14 and/or 15 driving alongside (S1040). If the active rear collision avoidance apparatus 10 receives a response to reject for the avoidance request signal from the preceding vehicle 13, and in turn, it may transmit the avoidance request signal to the vehicles 14 and/or 15 driving alongside in the adjacent lane as a next priority.

The active rear collision avoidance apparatus 10 may receive a response to the avoidance request signal from the vehicles 14 and/or 15 driving alongside (S1050).

When the response to accept for the avoidance request signal (YES in S1050), the active rear collision avoidance apparatus 10 may control the host vehicle 11 to change lanes (S1060). The vehicles 14 and/or 15 driving alongside may accelerate forward to provide an avoidable area to the host vehicle 11 or decelerate in the same direction as the vehicles and/or 15 driving alongside. The active rear collision avoidance apparatus 10 may control the host vehicle 11 to change lanes in response to the driving of the vehicles 14 and/or 15 driving alongside. For example, when the vehicle driving alongside accelerates forward, the active rear collision avoidance apparatus 10 may control the host vehicle 11 to change lanes while maintaining the current driving speed. As another example, when the vehicle driving alongside decelerates in the traveling direction, the active rear collision avoidance apparatus 10 may control the host vehicle 11 to change lanes while accelerating it.

When the response to reject for the avoidance request signal (NO in S1050), the active rear collision avoidance apparatus 10 may control the host vehicle 11 to drive in the direction capable of minimizing the expected amount of impact of the possible collision between the vehicle 12 at risk of collision and the host vehicle 11 (S1070).

In the meantime, the active rear collision avoidance apparatus 10 may control the occupant(s) aboard the host vehicle 11 to selectively output a horn or a hazard light throughout the entire stages of FIGS. 8 to 10 as occasion demands. Further, the active rear collision avoidance apparatus 10 may control the host vehicle 11 to output a horn and/or a hazard light, or to output a voice message informing a driver or occupant of the host vehicle of a possible collision prior to execution of the step S1070. This is to prioritize any other alternative avoidable option, if any, because a collision between the host vehicle 11 and the vehicle 12 at risk of collision might cause unexpected variable situations, and the criterion for the minimum amount of impact may pose a certain critical ethical/legal issue. Furthermore, it is because the solution to minimize the damage will have to be in a selectable state, if it is determined that an occurrence of accident is the second best possible option, depending upon a result of determining an estimated final damage.

As understood from the foregoing, according to the embodiments of the present disclosure, it is possible to provide an active rear collision avoidance apparatus and method capable of avoiding a collision with the vehicle 12 at risk of collision according to the priority set for each situation, particularly in a situation in which a collision between the vehicle 12 at risk of collision and the host vehicle 11 is expected.

The technology for providing such an active rear collision apparatus and method may be implemented in the form of program instructions that can be executed through various computer components and recorded in a computer-readable recording medium. The above-described computer-readable recording medium may include program instructions, data files, data structures, and so on either alone or in combination.

The program instructions recorded in the above-described computer-readable recording medium may be specially designed and configured for the present disclosure, or may be ones known and usable to those skilled in the field of computer software art.

Examples of those computer-readable recording media may include various hardware devices specially designed and configured to store and/or execute program instructions, such as, for example, magnetic media such as hard disks, floppy disks and magnetic tapes, optical recording media such as CD-ROMs and DVDs, magneto-optical media such as floptical disks, ROM, RAM, flash memory, or the like.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

EXPLANATION OF REFERENCE NUMERALS

1: active rear collision avoidance system
10: active rear collision avoidance apparatus
11: host vehicle
12: vehicle at risk of collision
13: preceding vehicle
14 and 15: other vehicles
210: sensor
220: controller

What is claimed is:

1. An active rear collision avoidance apparatus comprising:
 a sensor for acquiring information by detecting at least one of a preceding vehicle in the same lane as a host vehicle, a vehicle at risk of collision, or other vehicles driving in an adjacent lane, running within a predetermined distance from the host vehicle; and
 a controller for determining a possibility of collision between the vehicle at risk of collision and the host vehicle, determining a direction of avoidance preferentially from where an avoidable area exists in response to the driving of the vehicle at risk of collision, if the possibility of collision is higher than or equal to a threshold point, the direction of avoidance being determined in the order of a driving lane of the host vehicle and its adjacent lane, controlling the host vehicle to drive to avoid in the determined direction of avoidance if the determined direction of avoidance is within the avoidable area, transmitting an avoidance request signal to the preceding vehicle and the other vehicle driving in an adjacent lane if there are any preceding vehicle and/or the other vehicle driving in the determined direction of avoidance, and controlling the host vehicle to drive to avoid a possible collision in response to a response to the transmitted avoidance request signal from the preceding vehicle and/or the other vehicle,
 wherein the controller controls to:
  if no avoidable area exists and the direction of avoidance is determined as the driving lane of the host vehicle, transmit the avoidance request signal to the preceding vehicle of the host vehicle, and
  upon receiving a response to accept for the avoidance request signal from the preceding vehicle by providing a space for the host vehicle to avoid a collision, accelerate to further increase a distance from the vehicle at risk of collision.

2. The active rear collision avoidance apparatus according to claim 1, wherein the controller controls to:
 if the avoidable area exists in the driving lane of the host vehicle and the direction of avoidance is determined as the driving lane of the host vehicle, accelerate in the traveling direction of the host vehicle, and if the avoidable area exists in the adjacent lane of the host vehicle and the direction of avoidance is determined as the adjacent lane, accelerate and change lanes to the adjacent lane.

3. The active rear collision avoidance apparatus according to claim 1, wherein the controller controls to:
if no avoidable area exists and the direction of avoidance is determined as the adjacent lane of the host vehicle, transmit the avoidance request signal to the vehicle driving alongside in the adjacent lane of the host vehicle, and
upon receiving a response to accept for the avoidance request signal from the vehicle driving alongside, change lanes for the host vehicle.

4. The active rear collision avoidance apparatus according to claim 1, wherein the controller controls to:
upon receiving a response to reject for the avoidance request signal from the preceding vehicle, modify the direction of avoidance of the host vehicle except for the direction of avoidance in which the preceding vehicle is located.

5. The active rear collision avoidance apparatus according to claim 1, wherein the controller controls to:
upon receiving a response to reject for the avoidance request signal from the preceding vehicle and the other vehicles corresponding to all direction of avoidance, determine an expected amount of impact with the vehicle at risk of collision, and drive the host vehicle in a direction capable of generating the minimum amount of impact in a possible collision with the vehicle at risk of collision.

6. The active rear collision avoidance apparatus according to claim 1, wherein the controller controls to:
if the vehicle at risk of collision is controllable through V2X, transmit to the vehicle at risk of collision a speed control request signal for controlling to keep a predetermined vehicle interval from the host vehicle.

7. The active rear collision avoidance apparatus according to claim 1, wherein the controller controls to:
if a possibility of collision between the vehicle at risk of collision and the host vehicle is greater than or equal to a threshold point, transmit information on the vehicle at risk of collision to the preceding vehicle, the vehicle at risk of collision, and the other vehicle, running within the predetermined distance from the host vehicle.

8. The active rear collision avoidance apparatus according to claim 1, wherein the controller controls to:
if a response to the avoidance request signal received from the preceding vehicle and the other vehicles is to secure a space for avoidance of the host vehicle, drive the host vehicle to evade to the space secured by the preceding vehicle and the other vehicles.

9. The active rear collision avoidance apparatus according to claim 1, wherein the controller controls to:
if the possibility of collision between the vehicle at risk of collision and the host vehicle is greater than or equal to a threshold point, output a horn or a hazard light.

10. An active rear collision avoidance method, comprising:
a neighboring vehicle location receiving step for acquiring information by detecting at least one of a preceding vehicle in the same lane as a host vehicle, a vehicle at risk of collision, or other vehicles driving in adjacent lanes, running within a predetermined distance from the host vehicle;
a collision risk determination step for determining a possibility of collision between the vehicle at risk of collision and the host vehicle;
an avoidance direction determination step for determining a direction of avoidance preferentially from a space where an avoidable area exists in response to the driving of the vehicle at risk of collision, if the possibility of collision is higher than or equal to a threshold point, the direction of avoidance being determined in the order of a driving lane of the host vehicle and its adjacent lanes; and
a host vehicle control step for controlling the host vehicle to drive to avoid in the determined direction of avoidance if the determined direction of avoidance is within the avoidable area, transmitting an avoidance request signal to the preceding vehicle and the other vehicles driving in the adjacent lanes if there are any preceding vehicle and/or the other vehicles driving in the determined direction of avoidance, and driving the host vehicle to avoid a possible collision in response to a response from the preceding vehicle 13 and/or the other vehicles for the avoidance request signal,
wherein the host vehicle control step further comprises the steps of:
if no avoidable area exists and the direction of avoidance is determined as the driving lane of the host vehicle, transmitting the avoidance request signal to the preceding vehicle of the host vehicle, and
upon receiving a response to accept for the avoidance request signal from the preceding vehicle by providing a space for the host vehicle to avoid a collision, controlling to accelerate to further increase a distance from the vehicle at risk of collision.

11. The active rear collision avoidance method according to claim 10, wherein the host vehicle control step further comprises the steps of:
if the avoidable area exists in the driving lane of the host vehicle and the direction of avoidance is determined as the driving lane of the host vehicle, accelerating in the traveling direction of the host vehicle; and
if the avoidable area exists in the adjacent lane of the host vehicle and the direction of avoidance is determined as the adjacent lane, accelerating and changing lanes to the adjacent lane.

12. The active rear collision avoidance method according to claim 10, wherein the host vehicle control step further comprises the steps of:
if no avoidable area exists and the direction of avoidance is determined as the adjacent lane of the host vehicle, transmitting the avoidance request signal to the vehicle driving alongside in the adjacent lane of the host vehicle, and
upon receiving a response to accept for the avoidance request signal from the vehicle driving alongside, changing lanes for the host vehicle.

13. The active rear collision avoidance method according to claim 10, wherein the avoidance direction determination step further comprises the step of:
upon receiving a response to reject for the avoidance request signal from the preceding vehicle, modifying the direction of avoidance of the host vehicle except for the direction of avoidance in which the preceding vehicle is located.

14. The active rear collision avoidance method according to claim 10, wherein the host vehicle control step further comprises the steps of:

upon receiving a response to reject for the avoidance request signal from the preceding vehicle and the other vehicles corresponding to all direction of avoidance, determining an expected amount of impact with the vehicle at risk of collision, and controlling the host vehicle to drive in a direction capable of generating the minimum amount of impact in a possible collision with the vehicle at risk of collision.

15. The active rear collision avoidance method according to claim 10, wherein the avoidance direction determination step further comprises the step of:
if the vehicle at risk of collision is controllable through V2X, transmitting to the vehicle at risk of collision a speed control request signal for controlling to keep a predetermined vehicle interval from the host vehicle.

16. The active rear collision avoidance method according to claim 10, wherein the avoidance direction determination step further comprises the step of:
if a possibility of collision between the vehicle at risk of collision and the host vehicle is greater than or equal to a threshold point, transmitting information on the vehicle at risk of collision to the preceding vehicle, the vehicle at risk of collision, and the other vehicle, running within the predetermined distance from the host vehicle.

17. The active rear collision avoidance method according to claim 10, wherein the host vehicle control step further comprises the step of:
if a response to the avoidance request signal received from the preceding vehicle and the other vehicles is to secure a space for avoidance of the host vehicle, controlling the host vehicle to evade to the space secured by the preceding vehicle and the other vehicles.

18. The active rear collision avoidance method according to claim 10, wherein the avoidance direction determination step further comprises the step of:
if the possibility of collision between the vehicle at risk of collision and the host vehicle is greater than or equal to a threshold point, controlling to output a horn or a hazard light.

* * * * *